US009622160B2

(12) United States Patent
Arzelier et al.

(10) Patent No.: US 9,622,160 B2
(45) Date of Patent: Apr. 11, 2017

(54) CAPTURING DATA FROM A MOBILE DEVICE THROUGH GROUP COMMUNICATION

(71) Applicant: BlackBerry Limited, Waterloo (CA)

(72) Inventors: Claude Jean-Frederic Arzelier, Molieres-sur-Ceze (FR); Michael Eoin Buckley, Grayslake, IL (US); Takashi Suzuki, Ichikawa (JP)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/870,678

(22) Filed: Sep. 30, 2015

(65) Prior Publication Data
US 2016/0360474 A1 Dec. 8, 2016

(30) Foreign Application Priority Data
Jun. 4, 2015 (EP) .................................. 15305854

(51) Int. Cl.
*H04W 48/16* (2009.01)
*H04M 3/22* (2006.01)
(Continued)

(52) U.S. Cl.
CPC ........... *H04W 48/16* (2013.01); *H04L 41/085* (2013.01); *H04M 3/2281* (2013.01); *H04W 4/08* (2013.01);
(Continued)

(58) Field of Classification Search
CPC ...... H04M 3/2281; H04L 63/306; H04W 4/02
See application file for complete search history.

(56) References Cited

U.S. PATENT DOCUMENTS

2004/0203582 A1 10/2004 Dorenbosch et al.
2012/0167165 A1 6/2012 Kim et al.
(Continued)

FOREIGN PATENT DOCUMENTS

WO 2014067875 5/2014

OTHER PUBLICATIONS

International Search Report and Written Opinion issued in International Application No. PCT/CA2016/050627 on Aug. 17, 2016.
(Continued)

*Primary Examiner* — Ping Hsieh
(74) *Attorney, Agent, or Firm* — Fish & Richardson P.C.

(57) ABSTRACT

Some aspects of what is described here relate to systems, devices, and computer-implemented methods for capturing data related to a mobile device in a wireless network. In one example, a method may include receiving, at a first mobile device, data capture configuration information from a wireless network. The data capture configuration information indicates a target mobile device from which data is to be captured during group communication between the first mobile device and the target mobile device. Thereafter, in response to detecting a group communication between the first mobile device and the target mobile device, a data element is stored in a local memory of the first mobile device. The data element includes information from the group communication between the first mobile device and the target mobile device. The data element is sent to the wireless network.

16 Claims, 4 Drawing Sheets

(51) Int. Cl.
*H04W 4/08* (2009.01)
*H04W 12/02* (2009.01)
*H04L 12/24* (2006.01)
*H04W 24/08* (2009.01)
*H04L 29/06* (2006.01)
*H04W 4/02* (2009.01)
*H04W 76/02* (2009.01)

(52) U.S. Cl.
CPC ........... *H04W 12/02* (2013.01); *H04W 24/08* (2013.01); *H04L 63/30* (2013.01); *H04W 4/02* (2013.01); *H04W 76/023* (2013.01)

(56) References Cited

U.S. PATENT DOCUMENTS

| | | |
|---|---|---|
| 2013/0029708 A1 | 1/2013 | Fox |
| 2013/0317944 A1 | 11/2013 | Huang |
| 2014/0162688 A1 | 6/2014 | Edge |
| 2015/0009864 A1* | 1/2015 | Kim .................... H04M 3/2281 370/259 |
| 2015/0056982 A1 | 2/2015 | Sorrentino |
| 2015/0326302 A1 | 11/2015 | Stojanovski |
| 2016/0028585 A1 | 1/2016 | Wager |

OTHER PUBLICATIONS

3GPP TSG-SA WG1 Meeting #57 (S1-120070); "Anonymously Multi-Party Communication Interception"; Institute for Information Industry (III); Kyoto, Japan; Feb. 13-17, 2013; 4 pages.

3GPP TSG-SA WG1 Meeting #57 (S1-120068); "Proximity Aware Service Consideration on Lawful Interception"; Institute for information Industry (III); Kyoto, Japan; Feb. 13-17, 2013; 4 pages.

Extended European Search Report issued in European Application No. 15305854.0 on Nov. 16, 2015.

Extended European Search Report issued in European Application No. 15305855.7 on Nov. 16, 2015.

International Search Report and Written Opinion issued in International Application No. PCT/CA2016/050632 on Aug. 4, 2016.

3GPP TS 33.106 V12.5.0; 3rd Generation Partnership Project; Technical Specification Group Services and System Aspects; 3G Security; Lawful Interception Requirements (Release 12); Dec. 2014.

3GPP TS 23.303 V12.4.0; 3rd Generation Partnership Project; Technical Specification Group Services and System Aspects; Proximity-Based Services (ProSe); Stage 2; (Release 12); Mar. 2015.

3GPP TSG-SA WG3-LI Meeting #53; SA3LI14_077r2; "Reply LS on ProSe Lawful Interception"; New Orleans, Louisiana, Apr. 29-May 1, 2014.

3GPP TS 36.304 V.12.4.0; 3rd Generation Partnership Project; Technical Specification Group Radio Access Network; Evolved Universal Terrestrial Radio Access (E-UTRA); User Equipment (UE) Procedures in Idle Mode (Release 12); Mar. 2015.

3GPP TS 33.107 V12.10.0; 3rd Generation Partnership Project; Technical Specification Group Services and System Aspects; 3G Security; Lawful Interception Architecture and Functions (Release 12); Mar. 2015.

Intel; SA WG2 Meeting #105; S2-143714; "System-, application- and IMS-level considerations for MCPTT Network Mode Operation via Relay (NMO-R)"; Sapporo, Japan; Oct. 13-17, 2014.

3GPP TS 31.102 V11.7.0; 3rd Generation Partnership Project; Technical Specification Group Core Network and Terminals; Characteristics of the Universal Subscriber Identity Module (USIM) Application (Release 11); Sep. 2014.

3GPP TS 31.111 V11.11.0; 3rd Generation Partnership Project; Technical Specification Group Core Network and Terminals; Universal Subscriber Identity Module (USIM) Application Toolkit (USAT) (Release 11); Dec. 2014.

* cited by examiner

CAPTURING DATA FROM A MOBILE DEVICE THROUGH GROUP COMMUNICATION

CLAIM OF PRIORITY

This application claims priority to EP Patent Application Serial No. 15305854.0, filed on Jun. 4, 2015, the entire contents of which are hereby incorporated by reference.

BACKGROUND

This specification relates to capturing data from a mobile device through group communication.

Mobile devices (also referred to as user equipment or "UE") on a wireless network use network resources from the wireless network to communicate with other mobile devices, or use services out of the wireless network (such as, for example, web browsing, information upload/download, etc.). Examples of such networks are 3GPP networks that provide cellular network coverage to mobile devices. Government organizations and/or law enforcement agencies (LEA) (such as, for example, FBI, UK Home Office, etc.) may lawfully intercept information related to a user of a wireless network. Information capture may be achieved, for instance, through a lawful intercept (LI) process initiated following court orders triggered by LEAs.

DETAILED DESCRIPTION

Figure 1:
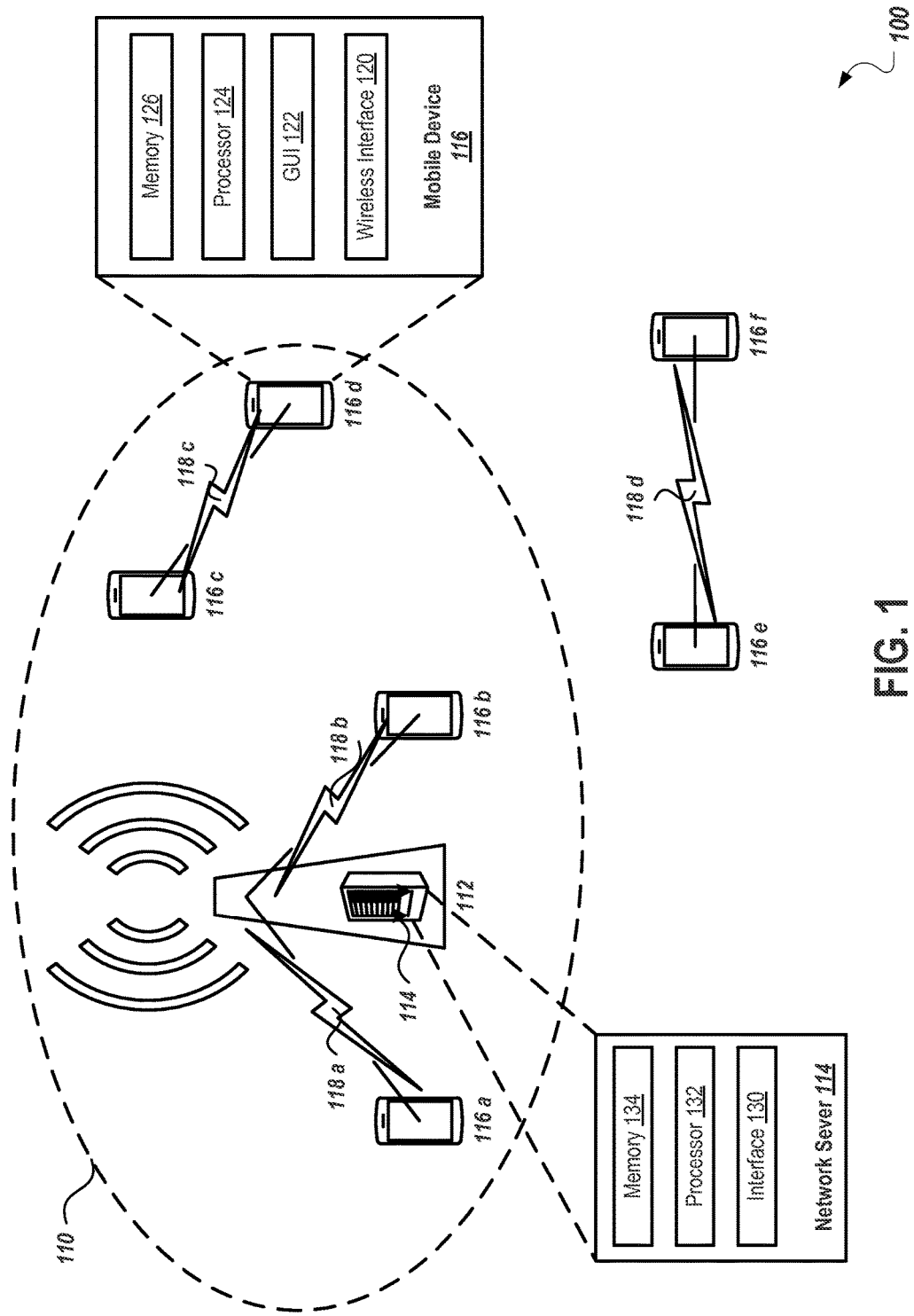
FIG. 1 is a diagram of an example wireless environment for capturing data related to a mobile device.

Some aspects of what is described here relate to systems, devices, and computer-implemented methods for capturing data related to a mobile device in a wireless network. In one example, a method may include receiving, at a first mobile device, data capture configuration information from a wireless network. The data capture configuration information indicates a target mobile device from which data is to be captured during group communication between the first mobile device and the target mobile device. Thereafter, in response to detecting a Proximity-based Services (ProSe) or group communication between the first mobile device and the target mobile device, a data element is stored in a local memory of the first mobile device. The data element includes information from the group communication between the first mobile device and the target mobile device. The data element is sent to the wireless network.

In some implementations, the data element includes data transmitted between the first mobile device and the target mobile device while the target mobile device operates in an off-network environment.

In some implementations, the first mobile device receives the data capture configuration information from the target mobile device.

In some implementations, the target mobile device stores a second data element in its local memory. The second data element includes additional information from the group communication between the first mobile device and the target mobile device. The target mobile device sends the second data element to the wireless network.

In some implementations, a second mobile device participates in the ProSe or group communication with the first mobile device and the target mobile device. The second mobile device stores a second data element in its local memory in response to detecting the ProSe or group communication. The second data element includes additional information from the group communication between the first mobile device and the target mobile device. The second mobile device sends the second data element to the wireless network.

In some implementations, the data capture configuration information indicates a time or time duration parameter for capturing data in the off-network environment.

In some implementations, the data capture configuration information indicates a location parameter for capturing data in the off-network environment.

In some implementations, the data capture configuration information indicates control plane data to be captured from the mobile device in an off-network environment.

In some implementations, the data capture configuration information indicates user plane data to be captured from the mobile device in an off-network environment.

In some implementations, the data element is sent to the wireless network in response to detecting an upload condition at the mobile device while the mobile device has access to the mobile network.

The details of these and other aspects and embodiments of the present disclosure are set forth in the accompanying drawings and the description below. Other features, objects, and advantages of the disclosure will be apparent from the description and drawings, and from the claims.

In some aspects of what is described here, cellular networks can capture data related to a target (e.g., a mobile device, a mobile device identifier, an International Mobile Equipment Identity IMEI, an International Mobile Subscriber Identity IMSI, a Mobile Station International Subscriber Directory Number MSISDN, etc.) when the target is under network coverage or when the target is off-network. For instance, a target in a 3GPP network can be a user entity subscribed to and operating in that 3GPP network, a user equipment operating in that 3GPP network (e.g., a HPLMN or a VPLMN), or a user roaming from another 3GPP network or from any other network capable of using that 3GPP network. The data capture process can be, for example, a lawful intercept (LI) process initiated by a law enforcement agency (LEA) or another type of data capture process.

The captured data can, for example, include user plane information, control plane information, or possibly other types of information. The user plane information may include information such as user-generated communication content (such as content of SMS received or sent) and/or content of conversation initiated as a caller or called party. The control plane information may include location information of the user and/or session control information (such as phone numbers called, etc.) In this situation, the cellular network may act as a forwarding entity and a delivery function of the law enforcement agency (LEA) that forwards data to the LEA as the cellular network receives/sends the data from/to a target mobile device. Although illustrated in 3GPP E-UTRAN Radio Access Technology (RAT), implementations of the subject matter described in this specification can be implemented in other RATs or other systems, including but not limited to, 3GPP UTRAN, 3GPP GERAN, IEEE 802.11x, CDMA2000, and others.

In some cases, data capture techniques can avoid or otherwise reduce the possibility of data tempering by the target mobile device. For instance, in some cases, the target mobile device cannot delete or modify the captured information, and the user of the target mobile device is not aware that the interception is occurring on the target mobile device. In some instances, these and other advantages can help avoid behavioral countermeasures from the intercepted target.

In the 3GPP Rel-12, for example, the work item of Device to Device (D2D) Proximity-based Services (ProSe) is introduced to allow ProSe direct communication between two or more ProSe-enabled UEs. When the UEs are in direct communication range, the UEs can communicate with each other using a direct communication path between the UEs without involving the 3GPP network. The UEs on ProSe communication can communicate via the UE-to-UE direct PC5 interface.

In addition, Public Safety UEs may be able to establish a communication path directly between two or more Public Safety (ProSe-enabled) UEs, even if those UEs are not served by 3GPP E-UTRAN. Public Safety UEs may be UEs operated by "First Responders" whose aim is to protect citizens and/or allow law enforcement. Examples of such "First Responders" using "Public Safety UEs" are Policemen, Ambulances, Firemen, or Mountain Rescuers. For example, the First Responder Network Authority, FirstNet, was created under the US National Telecommunication & Information Administration (NTIA) to implement a nationwide interoperable public safety broadband network for First Responders.

In ProSe communication, UEs may communicate directly, for example, via the PC5 interface. The 3GPP E-UTRAN is not in the PC5 path and may not be able to forward LI information when the target mobile device is in ProSe communication. In addition, Public Safety and First Responder UEs are not exempt from being potentially subject to LI. In some cases, LI may be required, for example, for post-mortem analysis of an emergency event, and/or for liability purposes. Therefore, there is a need for LI to be possible on Public Safety UEs and/or non-Public Safety UEs using, for example, ProSe communication both when the Public Safety UEs and/or non-Public Safety UEs are under, for example, the 3GPP network coverage and when the Public Safety UEs and/or non-Public Safety UEs are out of, for example, the 3GPP network coverage, in addition to the under-coverage need for LI for all UEs. UEs involved in a group communication or ProSe communication may be all in coverage or out of coverage, or some of them may be in coverage while the others are out of coverage (partial coverage).

When the target UE is in ProSe communication, traditional interception of communication/data may not be possible at the source by the Network. For example, this may be because the ProSe data traffic may not traverse the Network. Instead, in some examples, the ProSe data traffic is transmitted over the PC5 interface between the UEs. In such cases, the target UE may receive data capture configuration information from the network while under the network coverage. In some implementations, the data capture configuration information may indicate at least a data type to be captured from the target mobile device in an off-network environment (such as in ProSe communication whether under coverage or out of coverage). When in an off-network environment, the target mobile device may be triggered to store data locally based on the data capture configuration information. A mobile device may include a Mobile Equipment (ME) and a Universal Subscriber Identity Module (USIM). The data stored at the target mobile device may be stored, for example, at the ME and/or at the USIM of the target mobile device. The stored data may be uploaded to the network at a later time, such as when the target mobile device has access to the network.

When the target UE uploads captured data without any precaution, it may increase the detectability of the interception by the user of the target UE. For example, if the target UE uploads captured data without any precaution when the target UE regains network access, the target UE may start to upload data when it should not. In some cases, the uploading may lead to a change in the state of the target UE, such as, for example, in the 3GPP LTE terminology, the RRC state of the target UE would change from RRC Idle to RRC Connected. The change of the RRC state may lead to changes in behaviors of the target UE, such as, for example, measurement reports via RRC messages sent by the target UE towards the network. The target UE sending data via messages towards the network may be detected by the user of the target UE. In some cases, the user may download some applications that keep track of the RRC state of the UE the user is using. By noticing the UE switching to RRC connected state inexplicably, the user may suspect that his communications/data was intercepted. The sudden upload of data when the device is supposed to be idle may increase battery consumption of the device, that may be detected by the user of the target UE.

In some implementations, the target UE may apply an intentional delay for uploading the stored data. For example, the target UE may wait for a pre-defined period of time after the target UE regains network access before uploading the stored data. In some instances, once in coverage, the target UE waits to be in Connected mode (also referred to as RRC Connected, Connected mode) by other actions (e.g., making a call) before uploading the stored data. By implementing the intentional delay, the target UE may not switch from idle to connected mode for the sole purpose of uploading the stored data.

When the target UE stores data locally whether, for example, at the ME and/or at the USIM of the target UE, the user of the target UE may detect the interception and may try to tamper with the stored data. As one possible solution, intercepted data may be stored at other UEs. In some implementations, distributed recording is applied to a number of UEs that are involved in communications with the target UE. In the distributed recording, a split may be defined between the UEs as to which UE records what. The distributed recording may reduce the amount of data to be stored by each UE, mitigate the storage requirement per UE, shorten the uploading time per UE, and thus may decrease the chance of detectability by the user of the target UE.

In some implementations, duplicated recording is applied to the UEs. In the duplicated recording, more than one UE will record specific data. The LEA may acquire several copies of the specific data from different UEs, and by cross-referencing the several copies, the LEA may have increased confidence in the intercepted data. Even if the user of the target UE succeeds in tampering with the stored date at the target UE, duplicated data stored at other UEs may provide more reliable recovery of the untampered intercepted data.

In some implementations, data is not stored by the target UE. Instead, another UE involved in the communication with the target UE may store the data. In such scenarios, which may be referred to as recording by other side(s) (ROS), the target UE neither stores nor uploads the data. The ROS scenario may decrease the detectability of recording and upload, as seen by the user of the target UE.

FIG. 1 is a block diagram of an example wireless environment 100 for capturing data related to a mobile device. The example wireless environment 100 includes a wireless network 112 and a number of mobile devices 116 (such as 116a, 116b, 116c, 116d, 116e and 116f shown in FIG. 1). The wireless environment 100 can include additional wireless networks connected to each other through a network, not shown in FIG. 1. The wireless environment 100 can include more or fewer mobile devices. Accordingly, six mobile devices 116 are depicted in FIG. 1 employing various example methods of communication.

As illustrated, the wireless network 112 includes an example network server 114. In some instances, the wireless network 112 may include additional network servers. The example network server 114 facilitates wireless or wireline communications between the components of the wireless environment 100 (e.g., between mobile devices 116, and among others), as well as with any other local or remote computer, such as additional mobile devices, servers, or other devices communicably coupled to wireless network 112, including those not illustrated in FIG. 1. In the illustrated environment, the wireless network 112 is depicted as a single network, but may be comprised of more than one network. In some instances, at least a portion of the wireless network 112 may represent a connection to the Internet. Further, all or a portion of the wireless network 112 can include either a wireline or wireless link. Example wireless links may include 802.11ac/ad/af/a/b/g/n, 802.20, WiMax, LTE, and/or any other appropriate wireless link. The wireless network 112 may communicate, for example, Internet Protocol (IP) packets, Frame Relay frames, Asynchronous Transfer Mode (ATM) cells, voice, video, data, and other suitable information between network addresses.

As illustrated, network server 114 includes an interface 130, a processor 132, and memory 134. In general, the network server 114 is a representation of one or more systems and/or servers that provide the described functionality, and is not meant to be limiting, but rather an example of the systems possible.

The example interface 130 is used by the network server 114 for communicating with other systems in a distributed environment—including within the environment 100—connected to the wireless network 112, e.g., mobile device(s) 116 and other systems communicably coupled to the wireless network 112. Generally, the interface 130 includes logic encoded in software and/or hardware in a suitable combination and operable to communicate with the network server 114. More specifically, the interface 130 may include software supporting one or more communication protocols associated with communications such that the network server 114 or interface's hardware is operable to communicate physical signals within and outside of the illustrated environment 100.

As illustrated in FIG. 1, the network server 114 includes a processor 132. Although illustrated as a single processor 132 in FIG. 1, two or more processors may be used according to particular needs, desires, or particular implementations of the environment 100. Each processor 132 may be a central processing unit (CPU), an application-specific integrated circuit (ASIC), a field-programmable gate array (FPGA), or another suitable component. Generally, the processor 132 executes instructions and manipulates data to perform the operations of the network server 114. Specifically, the processor 132 executes the algorithms and operations, including the operations performing the functionality associated with the network server 114 generally, including the functionality for sending communications to and receiving transmissions from mobile device(s) 116.

As illustrated, the example network server 114 includes memory 134. The memory 134 may include any memory or database module and may take the form of volatile or non-volatile memory including, without limitation, magnetic media, optical media, random access memory (RAM), read-only memory (ROM), removable media, or any other suitable local or remote memory component. The memory 134 may store various objects or data, including financial and/or business data, user information, behavior and access rules, administrative settings, password information, caches, applications, backup data, repositories storing business and/or dynamic information, and any other appropriate information including any parameters, variables, algorithms, instructions, rules, constraints, or references thereto associated with the purposes of mobile device(s) 116. Additionally, the memory 134 may store other appropriate data, such as VPN applications, firmware logs and policies, firewall policies, a security or access log, print or other reporting files, as well as others.

As illustrated, the example wireless network 112 has a coverage area 110. As shown in FIG. 1, four mobile devices (116a, 116b, 116c, and 116d) are under the coverage of the wireless network 112. Two mobile devices (116e and 116f in FIG. 1) are out of the coverage area of the wireless network 112. Among the four under-coverage mobile devices, two mobile devices (116a and 116b) are using network resources from the wireless network 112 to communicate with other mobile devices. For example, mobile device 116a can communicate with mobile device 116b through a wireless link 118a between the mobile device 116a and the wireless network 112, and a wireless link 118b between the mobile device 116b and the wireless network 112. In some instances, mobile device 116a can communicate with other mobile devices in another network through the wireless link 118a. For mobile devices 116a and/or 116b communicating through links with the wireless network 112, the wireless network 112 can act as a forwarding entity and forward data to the LEA as the wireless network 112 receives/sends the data from/to mobile devices 116a and/or 116b if mobile devices 116a and/or 116b are identified as target.

In some instances, mobile device 116c and mobile device 116d may communicate with each other through a direct communication path 118c (such as, for example, a ProSe communication link as in 3GPP Rel-12) without involving the wireless network 112 as illustrated in FIG. 1. Use of the direct communication path 118c is an example of operating in an off-network wireless environment. Even though both mobile devices (116c and 116d) are under the coverage of the wireless network 112, the communication between them may not be directly observed by the wireless network 112. In some implementations, data may be captured by the target mobile device involved in a communication with the target mobile device.

As illustrated, the example mobile devices 116e and 116f may communicate with each other through a direct communication path 118d (such as a ProSe communication link in 3GPP Rel-12) when both mobile devices (116e and 1160 are out of the coverage area 110 of the wireless network 112. Operating in a location outside the coverage area is an example of operating an off-network environment. Use of the direct communication path 118d is another example of an operating in an off-network environment. In some instances, one of the two mobile devices (for example, 116e) may be located within the coverage area 110 while the other (for example, 116f) is located outside the coverage area 110. In any these example off-network environments, data may be captured by a mobile device whether it is the target mobile device or the mobile device involved in a communication with the target mobile device.

As illustrated in FIG. 1, the example mobile devices 116 include a wireless interface 120, a graphical user interface (GUI) 122, a processor 124, and memory 126. Wireless interface 120, processor 124, and memory 126 may be similar to or different than the interface 130, processor 132, and memory 134 described with regard to network server 114. In general, processor 124 executes instructions and manipulates data to perform the operations of the mobile device 116. Similarly, wireless interface 120 provides the mobile device 116 with the ability to communicate with other systems in a distributed environment—including within the environment 100—connected to the wireless network 112, as well as the ability to communicate with other systems directly within a communication range. Memory 126 provides the mobile device 116 with storage, e.g., for data capture configuration information, capture data elements, or other information from a target mobile device.

The illustrated mobile device 116 is intended to encompass any computing device such as a desktop computer, laptop/notebook computer, mobile device, smartphone, personal data assistant (PDA), tablet computing device, one or more processors within these devices, or any other suitable processing device capable of sending and receiving electronic messages. For example, the mobile device 116 may be a computer that includes an input device, such as a keypad, touch screen, or other device that can accept user information, and an output device that conveys information associated with the operation of the mobile device 116 itself, including digital data, visual information, or a GUI 122, as shown with respect to the mobile device 116.

The wireless network 112 may indicate to a mobile device 116 information about LI data including the type of data that the network wants to intercept during the period when the mobile device is in an off-network environment. This may be referred to as data capture information. The information can be sent to the mobile device, for example, in NAS messages (e.g., 24.301), or to the USIM/eUSIM of the mobile device via SIM toolkit download (e.g., Application Toolkit 3GPP TS 31.111). If the information is stored in the USIM of the mobile device, those fields could be added to the ME-USIM interface 3GPP TS 31.102. In some instances, the mobile device may save the information as data capture configuration information that may be received during on-network times and then re-used later when the mobile device is in an off-network environment. The data capture configuration information may be sent from the network to the mobile device while the mobile device is under the coverage of the network and may be re-used later when the mobile device determines that it is in an off-network environment.

In some implementations, the mobile device may use the data capture configuration information to collect specific LI data and ignore other data not flagged as needed for LI purposes. The parameters in the configuration information may be used to control the type of data captured and the amount of resources used on the mobile device to store captured data while the mobile device is in an off-network environment. In some instances, when the mobile device regains network access, it may use the configuration to upload appropriate data to the network. In some instances, the data capture configuration information may be contained in a secure location or some protected part of the mobile device's storage (such as the memory 126).

Figure 2:
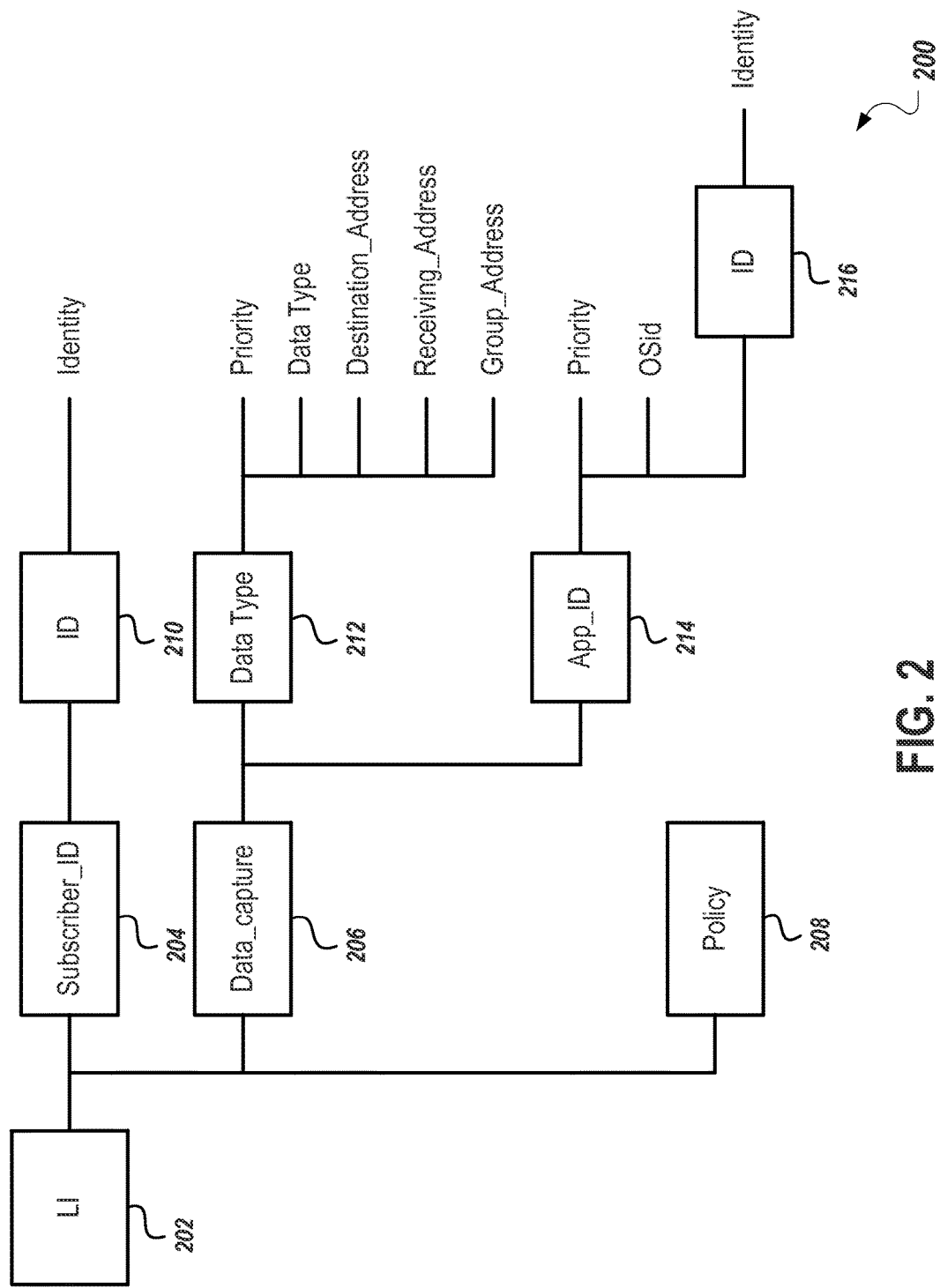
FIG. 2 is a diagram of an example data structure model for data capture configuration information.

FIG. 2 is a diagram showing an example of a data structure model 200 for data capture configuration information. In some instances, the data structure model 200 is used to store data captured from a mobile device in an off-network environment, an in-network environment, from a group communication, or in another context. For instance, the data structure model 200 can be used for lawful intercept by any of the example mobile devices 116 shown in FIG. 1, or in another type of wireless environment. Other types of data structures may be used.

The example data structure model 200 contains one or more LI profiles 202. Each LI profile includes a Subscriber_ID field 204, a Data_capture field 206, and a Policy field 208. The Subscriber_ID field 204 contains an ID field 210 which indicates a target mobile device's identity (such as the USIM number of the target mobile device). The Data_capture field 206 includes a Data Type field 212 and an App_ID field 214. The Data Type field 212 includes LI data information, such as, for example, priority, data type, destination address, receiving address, and group address. The App_ID field 214 includes application information of PL data, such as, for example, priority, OSid, and an ID field 216 which indicates an application identity. The Policy field 208 may contain rules on how to store the LI data.

Figure 3:
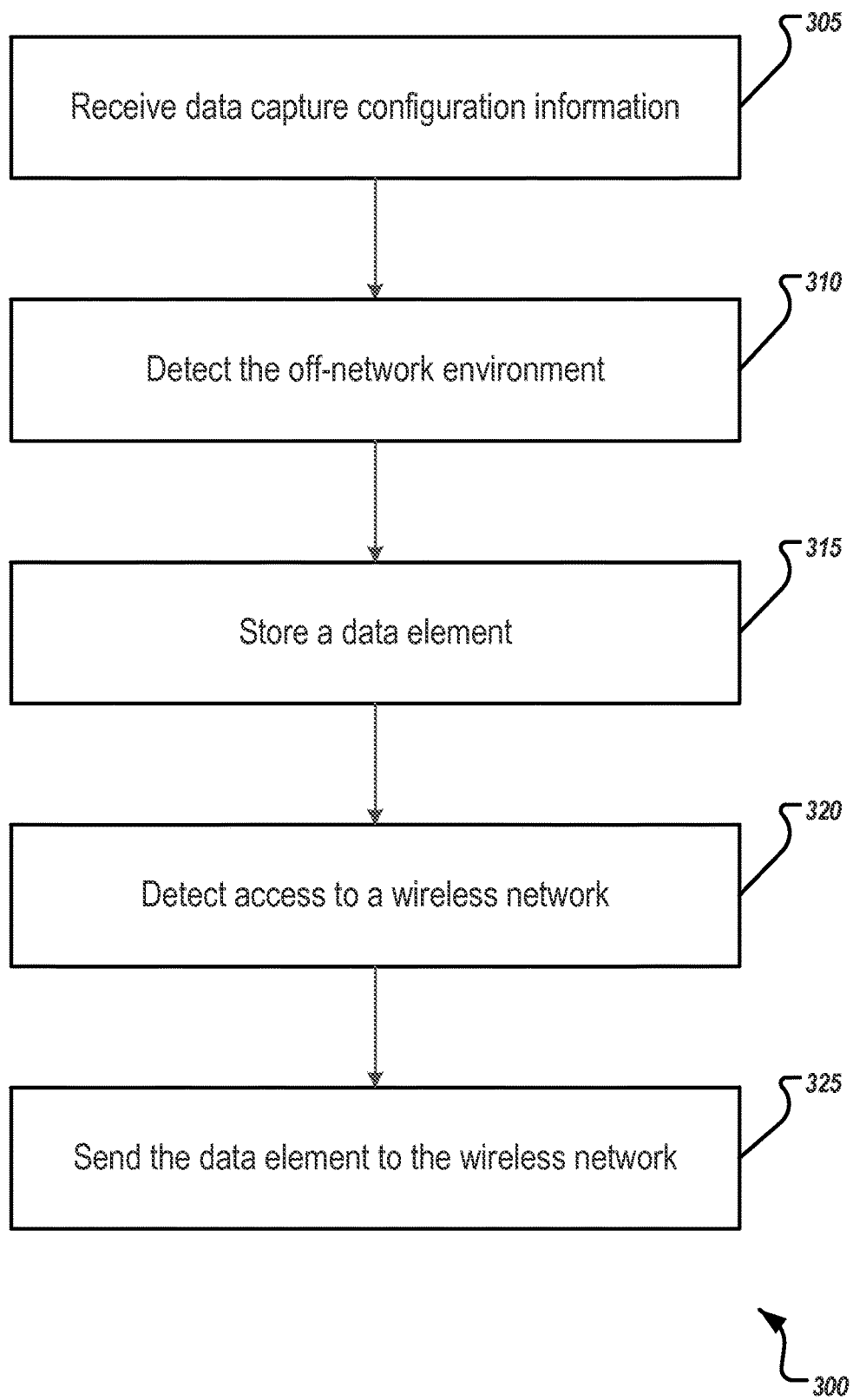
FIG. 3 is a flow diagram showing an example technique for capturing data from a mobile device when the mobile device is in an off-network environment.

FIG. 3 is a flow diagram showing an example process 300 for capturing data from a mobile device when the mobile device is in an off-network environment. The process 300 can be implemented in a communication system. For example, the process 300 can be implemented by one or more components of the communication system 100 shown in FIG. 1 or by a different type of system. In some cases, some or all aspects of the process 300 can be executed by a wireless terminal (e.g., the mobile device 116 of FIG. 1) or another type of wireless terminal. In some cases, the process 300 can be executed by multiple components, devices, or subsystems of the type shown in FIG. 1, or components, devices, or subsystems of additional or different types.

The example process 300 shown in FIG. 3 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 3 can be executed as multiple separate operations, or one or more subsets of the operations shown in FIG. 3 can be combined and executed as a single operation.

At 305, data capture configuration information is received by a mobile device. The mobile device can receive the data capture configuration information from a wireless network, such as, for example, a cellular network, when the mobile device is located in a coverage area of the cellular network. In some cases, when the mobile device is located outside the coverage area of the cellular network, the data capture configuration information can be received from another mobile device having a communication link with the mobile device. In some implementations, some or all of the data capture configuration information includes the type of data structure shown in FIG. 2. Other types of data capture configuration information can be used.

The data capture configuration information can indicate a time parameter, such as a begin/end time, a duration, etc., for capturing data. In some implementations, the data capture configuration information can indicate a location parameter, such as a cell ID, GPS coordinates, location area, RAT type, etc., for capturing data. In some implementations, the data capture configuration information can indicate control plane data, such as voice signaling, data signaling, etc., to be captured. In some implementations, the data capture configuration information can indicate user plane data, such as SMS, data, video, voice, etc., to be captured. In some cases, when the mobile device is in an off-network environment (e.g., located outside the coverage area of the cellular network, located inside the coverage area of the cellular network but utilizing proximity-based wireless services, etc.), the data capture configuration information can provide instructions on capturing data in the off-network environment.

At 310, the mobile device detects that it is in an off-network environment. This detection may happen as a result of one or more triggers as described below. The off-network environment may be detected by detecting that the mobile device is outside of radio coverage provided by a wireless network. The detection of off-network environment may also be detected by detecting that the mobile device is utilizing proximity-based wireless services. In some instances, the detection of off-network environment causes the mobile device to invoke storage of LI data at the mobile device.

In some implementations, the mobile device can operate in ProSE/MCPTT (Mission Critical Push To Talk) mode. For instance, 3GPP SA2 has defined four modes of operation related with ProSe. The modes are as follows:

1. Network-mode operation (NMO): MCPTT mode of operation where the mobile device is served directly by E-UTRAN and uses MCPTT service provided by the network;
2. Network-mode operation via relay (NMO-R): MCPTT mode of operation where the mobile device is served by a ProSe UE-to-Network Relay and uses MCPTT service provided by the network;
3. Direct-mode operation (DMO): MCPTT mode of operation where the MCPTT service is supported over ProSe Communication paths without network involvement;
4. Direct-mode operation via relay (DMO-R): MCPTT mode of operation where the mobile device is served by a ProSe UE-to-UE Relay and the MCPTT service is supported over ProSe Communication paths without network involvement.

In some instances, triggers may be activated when the mobile device is in Direct Mode of Operation (via Relay or not) or in NMO-R. When those triggers are activated the mobile device is aware that it has to use the data capture configuration information to store LI data. In other words, the control plane and user plane information sent/received by the mobile device are not going through the network when the mobile device is in those modes and LI data has to be stored at the mobile device if data capture information applies. In some instances, triggers may be activated when the NMO-R/DMO/DMO-R are effectively set up and after the mobile device receives messages that set up those modes from other mobile device, any Relay, or the MCPTT server. For example after that the device is configured by upper layers (e.g. ProSe function or initiated by user) to transmit or receive on the Sidelink shared channel (SL-SCH) that is a channel that is used for direct device-to-device communication in any of those three modes. The mobile device, in DMO or DMO-R, is not communicating with the network and may use the data capture configuration information previously received to assess which information (and possibly when) has to be stored and uploaded later. In NMO-R not all data channels communicate with the network and therefore same principle may apply. As an alternative, the device being transmitting or receiving on the SL-SCH (rather than having simply the SL-SCH configured) may be used as a trigger. As an alternative, the device being configured in other modes, or other mode combinations than DMO/DMO-R/NMO-R, is also possible to be used as a trigger.

In some implementations, another trigger for the mobile device to assess that it is outside of radio coverage of a serving cell may be used. A number of sub-triggers, which may be used instead or in conjunction with the other trigger, are listed below:

1. Serving cell not suitable. Following criteria from TS 36.304, for the example of LTE.
2. Serving cell not acceptable. Following criteria from TS 36.304, for the example of LTE.
3. Cell Selection criteria S not fulfilled. Following criteria from TS 36.304, for the example of LTE. This could apply to the Primary Cell or Secondary Cells.
4. The mobile device is in "Any Cell Selection state."
5. The mobile device is in "Camped on Any Cell state."

The detection of an off-network environment may be the result of one or more of the triggers listed above. Each of the listed criteria may be used independently, or in conjunction with the others, for the detection of an off-network environment. When more than one of the listed criteria are used in conjunction, the detection may be triggered, for example, when one of the criterion is fulfilled, or when all of the criteria are fulfilled.

At 315, a data element is stored in a local memory of the mobile device based on the data capture configuration information. The data element includes information sent and/or received by the mobile device, such as, for example, recordings of metadata, voices, videos, or images, when the mobile device is in the off-network environment.

At 320, the mobile device detects that it has access to the network. The detection of network access may, for example, be detecting that the mobile device is entering a radio coverage area provided by a wireless network. In some instances, the detection of network access may be detecting that the mobile device changes its state to network-mode. In some instances, the detection of network access causes the mobile device to upload stored LI data at the mobile device to the network.

At 325, the data element is sent to the wireless network. In some instances, the data element is sent to the wireless network, for example, in response to detecting an upload condition at the mobile device while the mobile device has access to the mobile network. For example, the upload condition may be detected by detecting a radio resource control of the mobile device being in a connected mode to communicate data other than the data element. In some instances, the upload condition may be detected by detecting an uplink control plane message to be transmitted by the mobile device for a reason different than Lawful Interception. A control plane message is a message that includes control information such as, for example, an Attach Request message or Tracking Area Update Request message.

In some implementations, an intentional delay may be applied when sending the data element to the wireless network. In some instances, the mobile device may wait for a pre-defined period of time or wait to be in a connected mode by other actions, such as, for example, a mobile originating or terminating call or a browsing session, before uploading the stored data. For example, in some instances, once the PC5 interface is no long being used (i.e., mobile device is not communicating using ProSe), the mobile device may wait to be in RRC Connected mode by other actions (such as a mobile originating or terminating call or a browsing session) before uploading the data element.

In some implementations, a logical channel may be applied when sending the data element to the wireless network. When uploading the data element to the network, the mobile device may use the same logical channels (e.g., LCID in MAC) or logical channel groups (e.g., LCG ID in MAC) that would normally be used for other user data/ control plane messages (e.g. LCG used for an SRB or for any other data traffic like VoIP data etc.) to upload the data element.

In some implementations, the mobile device may use the Access Point Name (APN) specified for normal data traffic to upload the data element to the network. In some other implementations, the data element may be included in an uplink Control Plane message, such as, for example, the TAU Request message. This could be especially useful, for instance, when the upload data element is reasonably small, for example, limited to only LI Control Plane information (such as the IRI).

Figure 4:
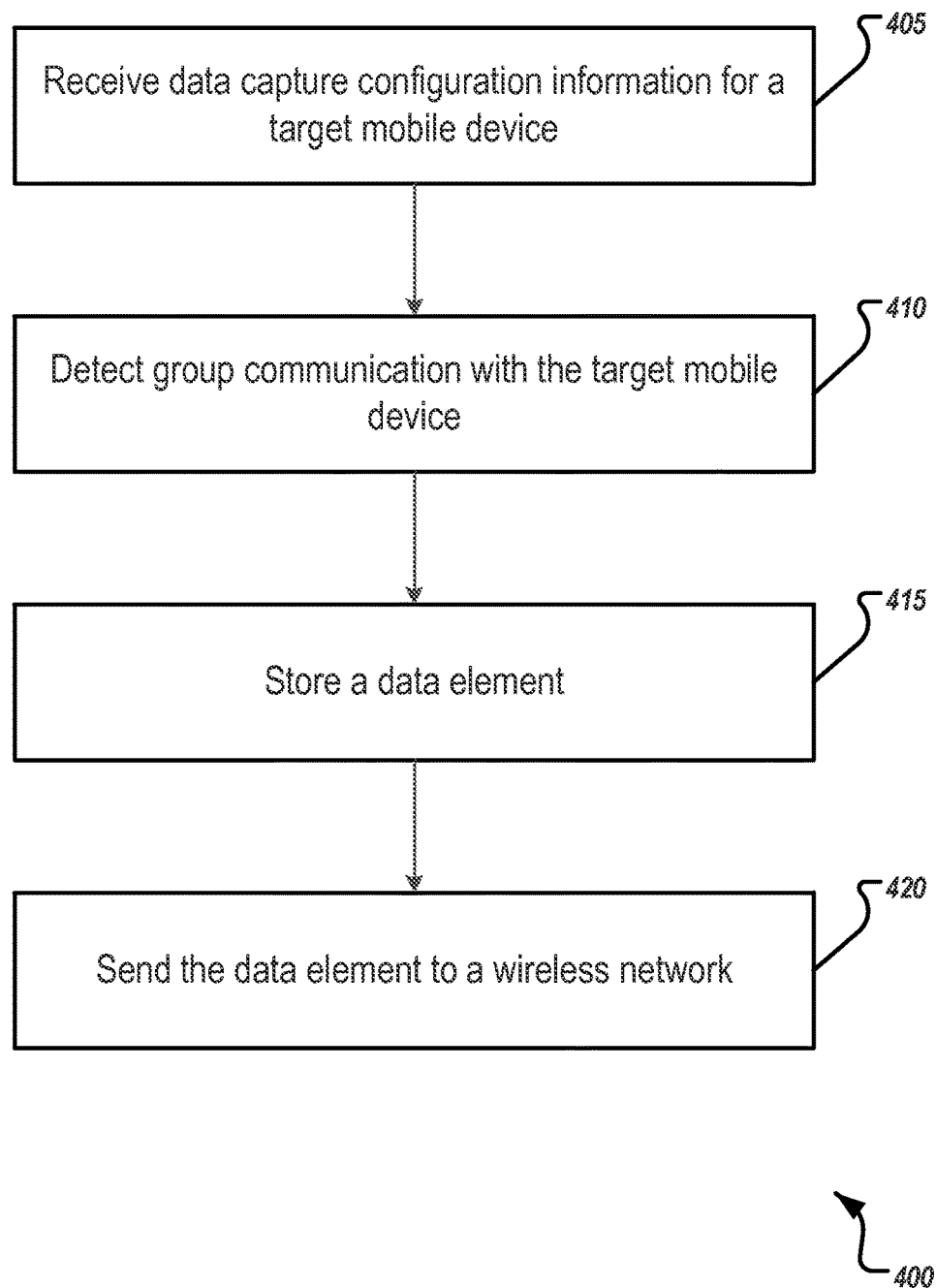
FIG. 4 is a flow diagram showing an example technique for capturing data from a mobile device when the mobile device is involved in a group communication.

FIG. 4 is a flow diagram showing an example process 400 for capturing data from a mobile device when the mobile device is involved in a group communication. Similar process may apply if the mobile device is involved in ProSe communication. The process 400 can be implemented in a communication system. For example, the process 400 can be implemented by one or more components of the communication system 100 shown in FIG. 1 or by a different type of system. In some cases, some or all aspects of the process 400 can be executed by a wireless terminal (e.g., the mobile device 116 of FIG. 1) or another type of wireless terminal. In some cases, the process 400 can be executed by multiple components, devices, or subsystems of the type shown in FIG. 1, or components, devices, or subsystems of additional or different types.

The example process 400 shown in FIG. 4 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 4 can be executed as multiple separate operations, or one or more subsets of the operations shown in FIG. 4 can be combined and executed as a single operation.

At 405, data capture configuration information is received by a mobile device. The data capture configuration information indicates a target mobile device from which data is to be captured during group communication between the mobile device and the target mobile device. The mobile device can receive the data capture configuration information from a wireless network, such as, for example, a cellular network, when the mobile device is located in a coverage area of the cellular network. In some cases, when the mobile device is located outside the coverage area of the cellular network, the data capture configuration information can be received from another mobile device, including the target mobile device, having a communication link with the mobile device. In some implementations, some or all of the data capture configuration information includes the type of data structure shown in FIG. 2. Other types of data capture configuration information can be used.

The data capture configuration information can indicate a time parameter, such as a begin/end time, a duration, etc., for capturing data. In some implementations, the data capture configuration information can indicate a location parameter, such as a cell ID, GPS coordinates, location area, RAT type, etc., for capturing data. In some implementations, the data capture configuration information can indicate control plane data, such as voice signaling, data signaling, etc., to be captured. In some implementations, the data capture configuration information can indicate user plane data, such as SMS, data, video, voice, etc., to be captured. In some cases, when the mobile device is in an off-network environment, such as located outside the coverage area of the cellular network, located inside the coverage area of the cellular network but operated in direct-mode (DMO), etc., the data capture configuration information can provide instructions on capturing data in the off-network environment.

At 410, a group communication between the mobile device and the target mobile device is detected. This is, for example, allowed by the Group Communications System Enablers for LTE (GCSE_LTE). The group communication can be a communication session (e.g., a voice call, a video conference, etc.) between two or more mobile devices. In some cases, the group communication can involve only the mobile device and the target mobile device. In some cases, the group communication can involve additional mobile devices. Similar principles may re-apply for two mobile devices if the two mobile devices are involved in ProSe communication.

At 415, a data element is stored in a local memory of the mobile device based on the data capture configuration information. The data element includes information from the group communication between the mobile device and the target mobile device, such as, for example, recordings of metadata, voice data, videos or images. In some cases, the data element includes data transmitted between the mobile device and the target mobile device, such as, for example, from the mobile device to the target mobile device, from the target mobile device to the mobile device, or both, while the target mobile device operates in an off-network environment.

In some cases, the target mobile device can store additional data in its local memory. For instance, the target mobile device can store an additional data element that includes additional information from the group communication between the mobile device and the target mobile device. In some instances, the additional information may include the control plane information, such as, for example, the location of the target mobile device, which may not be available at the other mobile device.

In some implementations, when multiple mobile devices participate in the group communication with the target mobile device in an off-network environment, data transmitted between the multiple mobile devices and the target mobile device can be stored in local memories of the multiple mobile devices. Similar process may apply for two mobile devices in ProSe communication. In some cases, each of the multiple mobile devices can store the whole data element. In some cases, each of the multiple mobile devices can store a portion of the data element, for example, according to predetermined rules. One example of a predetermined rule can be defined for each of the multiple mobile devices to store data at a different time according to a common timing reference, such as, for example, GPS time reference, UTC, System Frame Number (SFN), or Direct Frame Number (DFN).

In some implementations, distributed recording is applied among the multiple mobile devices. In the distributed recoding, one of the mobile devices involved in the communication may record data at a time according to a predetermined rule. Thus, in this implementation, each of the mobile devices (or a subset thereof) will record a different piece of the data to be captured. This applies, for example, for two mobile devices in the case of ProSe communication. In another example, in off-network operation, multiple mobile devices in a group communication communicate with each other. More than one mobile device in the group communication may record the conversation and the mobile device recording the communication or other LI information at a given time may change according to the predetermined rule. For example, eight mobile devices may be involved in off-network group communication. The first mobile device may record during the first period, the second mobile device may record during the second period, and so on. In some instances, the recording mobile device may include a digital signature into the recording to ensure authenticity of the recording. The digital signature may be computed based, for example, on at least part of a group communication key, the identity of the mobile device, the ME, or the USIM of the mobile device.

An example of the predetermined rule is described. For DFN timing reference, one mobile device involved in the group communication counts the total number of mobile devices, $N_u$, in the group communication, and provides this number to other mobile devices via a channel read by other mobile devices. The channel may, for example, be a channel providing master information block for slide link direct communication or the Side Link Broadcast Channel SL-BCH. When each mobile device joins the group communication, identified for example by an identification number such as by ProSe L2 group ID, each mobile device may be given a different index i by the mobile device which is the moderator of the group communication. The index i may range, for example, from 0 to ($N_u$−1). The mobile device with the index i records the group communication during the DFN that validates the following formula:

$$\text{DFN mod } N_u = i.$$

In this example, each recording duration is equal to the duration of a DFN, e.g., 10 ms. In some instances, the recording duration for each mobile device could be different. Media has to be recorded for the DFN values that validate:

$$(\text{Floor}(\text{DFN}/2)) \bmod N_u = i.$$

Other time allocations or formulas are possible. For example, if half of the mobile devices in the group communication record the session, the formula could become:

$$\text{DFN mod}(N_u/2) = i.$$

When one mobile device leaves the group communication or is about to lose the common time reference from the mobile device providing the common time reference, sometimes known as SyncRef UE, the mobile device may broadcast to other mobile devices (using, for example, the ProSeL2 group Id) that it has left the coverage of other mobile devices. The other mobile devices remaining in the group communication may know the new total number of mobile devices and the new time allocation to use. In some instances, all mobile devices remaining in the group communication would have their index i re-assigned. In some other instances, only some of the mobile devices remaining in the group communication may have their index i re-assigned. In some instances, the leaving mobile device may indicate its index, for example, to the ProseL2 group Id. In some cases, the mobile device with the highest index (e.g., equal to ($N_u$−1)) may change its index to the index of the leaving mobile device.

In some implementations, duplicated recording is applied among the multiple mobile devices. In the duplicated recoding, more than one mobile device may record the same LI information. For example, at a given time, more than one mobile device may record LI data. If the recording of a certain duration is made by multiple mobile devices, recording can be replicated for, possibly, more reliable recovery of the specific LI information. In some instances, the LEA may upload several copies of the recorded communication from different mobile devices involved in the group communication. By cross-referencing the several uploads, the LEA may have greater confidence in the intercepted data. For example, if all copies uploaded from different mobile devices are the same, the LEA may have greater confidence that the intercepted data has not been tampered. Otherwise, at least one copy has been compromised.

An example of a generalized distributed recording is described. The goal is to have more than one copy of the communication data recorded by the group of mobile devices. Using the example described above, one implementation may be as follows:

$N_u$ mobile devices are given the indexes i ranging from 0 to $N_u$−1;

The mobile device with index i records the group communication for the DFNs for which one (or more) of the two formulas below is true:

$$(\text{Floor}(\text{DFN}/2)) \bmod N_u = i.$$

Or:

$$(\text{Floor}(\text{DFN}/2)) \bmod N_u = i+1 \text{ (or } = 0 \text{ if } i+1 = N_u).$$

In some other instances, duplication of recording information may be performed by two or more mobile devices without defining time periods, such as, for example, for Control Plane information. Each mobile device may be instructed to record similar relevant information (such as, for example, location information of each mobile device).

In some instances, distributed recording and duplicated recording are used separately. In some other instances, distributed recording and duplicated recording are used together. For example, if six mobile devices are in a group communication, mobile devices 0 and 1 may record periodically a first third of group communication, mobile devices 2 and 3 may record periodically a second third, and mobile devices 4 and 5 may record periodically a last third.

In some implementations, ROS is applied among the multiple mobile devices. In the ROS, LI data may not be stored by the target mobile device but by another mobile device having the group communication with the target mobile device. The ROS may apply when two mobile devices are in communication (for example, using ProSe communication, not necessarily a group communication, or using group communication at two mobile devices), or more than two mobile devices are in a group communication. In some instances, one or more mobile device may be considered as the "other side" mobile device(s).

At 420, the data element is sent to the wireless network. In some cases, the data element is sent to the wireless network in response to detecting an upload condition at the mobile device while the mobile device has access to the mobile network, for example, when the mobile device's mode of operation is changed from direct-mode operation to network-mode operation, as defined in 3GPP SA2. In some cases, when the target mobile device has stored additional data element in its local memory, the target mobile device sends the additional data element to the wireless network.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of nonvolatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and/or parallel processing may be advantageous and performed as deemed appropriate.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A method of performing data capture from a mobile device, the method comprising:

at a first mobile device, receiving data capture configuration information from a wireless network indicating a target mobile device from which data is to be captured during group communication including the first mobile device and the target mobile device, wherein a second mobile device receives data capture configuration information from the wireless network indicating the target mobile device from which data is to be captured during group communication including the second mobile device and the target mobile device;

after receiving the data capture configuration information and in response to detecting a group communication between the first mobile device and the target mobile device, storing a data element in a local memory of the first mobile device, the data element comprising information from the group communication including the first mobile device and the target mobile device, wherein the second mobile device stores a data element in a local memory after receiving the data capture configuration information and in response to detecting a group communication between the second mobile device and the target mobile device, and the element comprising information from the group communication including the second mobile device and the target mobile device; and sending the data element stored in the local memory of the first mobile device to the wireless network, wherein the second mobile device sends the data element stored in the local memory of the second mobile device.

2. The method of claim 1, wherein the first mobile device receives the data capture configuration information from the target mobile device.

3. The method of claim 1, wherein the target mobile device stores a second data element in its local memory, the second data element comprising additional information from the group communication between the first mobile device and the target mobile device, and wherein the target mobile device sends the second data element to the wireless network.

4. The method of claim 1, wherein the data capture configuration information indicates a time parameter for capturing data in the off-network environment.

5. The method of claim 1, wherein the data capture configuration information indicates a location parameter for capturing data in the off-network environment.

6. The method of claim 1, wherein the data capture configuration information indicates control plane data to be captured from the mobile device in an off-network environment.

7. The method of claim 1, wherein the data capture configuration information indicates user plane data to be captured from the mobile device in an off-network environment.

8. The method of claim 1, wherein the data element is sent to the wireless network in response to detecting an upload condition at the mobile device while the mobile device has access to the mobile network.

9. A first mobile device comprising:
a data-processing apparatus; and
memory storing instructions that are operable, when executed by the data-processing apparatus, to cause the mobile device to perform operations comprising:
receiving data capture configuration information indicating a target mobile device from which data is to be captured during group communication including the first mobile device and the target mobile device, wherein a second mobile device receives data capture configuration information from the wireless network indicating the target mobile device from which data is to be captured during group communication including the second mobile device and the target mobile device;
after receiving the data capture configuration information and in response to detecting a group communication between the first mobile device and the target mobile device, storing a data element in a local memory of the first mobile device, the data element comprising information from the group communication including the first mobile device and the target mobile device, wherein the second mobile device stores a data element in a local memory after receiving the data capture configuration information and in response to detecting a group communication between the second mobile device and the target mobile device, and the element comprising information from the group communication including the second mobile device and the target mobile device; and sending the data element stored in the local memory of the first mobile device to the wireless network, wherein the second mobile device sends the data element stored in the local memory of the second mobile device.

10. The mobile device of claim 9, wherein the data element comprises data transmitted between the first mobile device and the target mobile device while the target mobile device operates in an off-network environment.

11. The mobile device of claim 9, wherein the first mobile device receives the data capture configuration information from the target mobile device.

12. The mobile device of claim 9, wherein the target mobile device stores a second data element in its local memory, the second data element comprising additional information from the group communication between the first mobile device and the target mobile device, and wherein the target mobile device sends the second data element to the wireless network.

13. The mobile device of claim 9, wherein the data capture configuration information indicates a time parameter for capturing data in the off-network environment.

14. The mobile device of claim 9, wherein the data capture configuration information indicates a location parameter for capturing data in the off-network environment.

15. A wireless network system comprising:
a data-processing apparatus; and
memory storing instructions that are operable, when executed by the data-processing apparatus, to cause the wireless network to perform operations comprising:
sending data capture configuration information to a target mobile device, the data capture configuration information indicating a data type to be captured from a group communication of the target mobile device; and
after sending the data capture configuration information, receiving a data elements from a first mobile device and a second data element in a group communication with the target mobile device, the data elements corresponding to the data type indicated by the data capture configuration information and comprising information from the group communication the first mobile device, the second mobile device, and the target mobile device.

16. The wireless network system of claim 15, the operations comprising, after sending the data capture configuration information, receiving a second data element from the target mobile device, the second data element corresponding to the data type indicated by the data capture configuration information and comprising information from the group communication between the first mobile device and the target mobile device.

* * * * *

UNITED STATES PATENT AND TRADEMARK OFFICE
CERTIFICATE OF CORRECTION

| | |
|---|---|
| PATENT NO. | : 9,622,160 B2 |
| APPLICATION NO. | : 14/870678 |
| DATED | : April 11, 2017 |
| INVENTOR(S) | : Claude Jean-Frederic Arzelier, Michael Eoin Buckley and Takashi Suzuki |

It is certified that error appears in the above-identified patent and that said Letters Patent is hereby corrected as shown below:

In the Claims

Column 20, Lines 51-52, In Claim 15, delete "group communication the first mobile device" and insert -- group communication including the first mobile device --, therefor.

Signed and Sealed this
Eighth Day of August, 2017

Joseph Matal
*Performing the Functions and Duties of the
Under Secretary of Commerce for Intellectual Property and
Director of the United States Patent and Trademark Office*